(12) United States Patent
Suzuki

(10) Patent No.: US 7,711,720 B2
(45) Date of Patent: May 4, 2010

(54) APPLICATION SERVER, CACHE PROGRAM, AND APPLICATION SERVER SYSTEM

(75) Inventor: Takamune Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 10/766,839

(22) Filed: Jan. 30, 2004

(65) Prior Publication Data

US 2004/0193574 A1 Sep. 30, 2004

(30) Foreign Application Priority Data

Mar. 27, 2003 (JP) ............................. 2003-089216

(51) Int. Cl.
*G06F 17/30* (2006.01)
*G06F 13/00* (2006.01)
(52) U.S. Cl. ................. 707/700; 707/758; 711/113
(58) Field of Classification Search .................. None
See application file for complete search history.

(56) References Cited

U.S. PATENT DOCUMENTS

| 5,239,644 | A * | 8/1993 | Seki et al. ................... 710/52 |
| 5,748,985 | A * | 5/1998 | Kanai ......................... 711/130 |
| 5,933,832 | A * | 8/1999 | Suzuoka et al. ............. 707/101 |
| 6,505,200 | B1 * | 1/2003 | Ims et al. ....................... 707/8 |
| 7,020,750 | B2 * | 3/2006 | Thiyagaranjan et al. ..... 711/141 |
| 7,092,955 | B2 * | 8/2006 | Mah et al. ................... 707/100 |
| 2002/0099698 | A1 * | 7/2002 | Abe et al. ...................... 707/3 |
| 2002/0107835 | A1 * | 8/2002 | Coram et al. .................. 707/1 |
| 2002/0116457 | A1 * | 8/2002 | Eshleman et al. ........... 709/203 |
| 2003/0014469 | A1 * | 1/2003 | Ramaswamy ............... 709/105 |
| 2003/0018789 | A1 * | 1/2003 | Ishiguro ...................... 709/228 |
| 2003/0037204 | A1 * | 2/2003 | Ash et al. ................... 711/113 |
| 2004/0107319 | A1 * | 6/2004 | D'Orto et al. ............... 711/133 |
| 2005/0044064 | A1 * | 2/2005 | Haase ............................ 707/3 |
| 2006/0034267 | A1 * | 2/2006 | Torrey et al. ................ 370/360 |

FOREIGN PATENT DOCUMENTS

| JP | 6-175920 | 6/1994 |
| JP | 11-015714 | 1/1999 |

OTHER PUBLICATIONS

Naoyuki Ono, Oracle8i R8.1.7+ Oracle iAS New Functions & System Structure Guide, DB Magazine, vol. 10, No. 11, Japan, Shoeisha Co., Ltd. pp. 112-113.
Notice of Rejection, mailed Jun. 12, 2007 and Issued in priority Japanese Patent Application No. 2003-089216.
Japanese Office Action (mailed Sep. 11, 2007) of Japanese Patent Application No. 2003-089216.
Translation of paragraph [0021] of JP-11-015714 (submitted previously on Jul. 31, 2007).
Japanese Interrogation mailed Oct. 20, 2009 and issue in corresponding Japanese Patent Application 2007-27912.

* cited by examiner

*Primary Examiner*—John R. Cottingham
*Assistant Examiner*—Robert Timblin
(74) *Attorney, Agent, or Firm*—Staas & Halsey LLP

(57) ABSTRACT

An application server includes a cache memory that stores in a correlated form a retrieval condition and a retrieval result, an update condition setting unit that sets a cache update condition that indicates when the cache memory is to be updated; and an update processing unit that reads the retrieval condition from the cache memory upon fulfillment of the cache update condition, retrieves data as the retrieval result from the database using the retrieval condition, and updates the retrieval result in the cache memory corresponding to the retrieval condition.

10 Claims, 7 Drawing Sheets

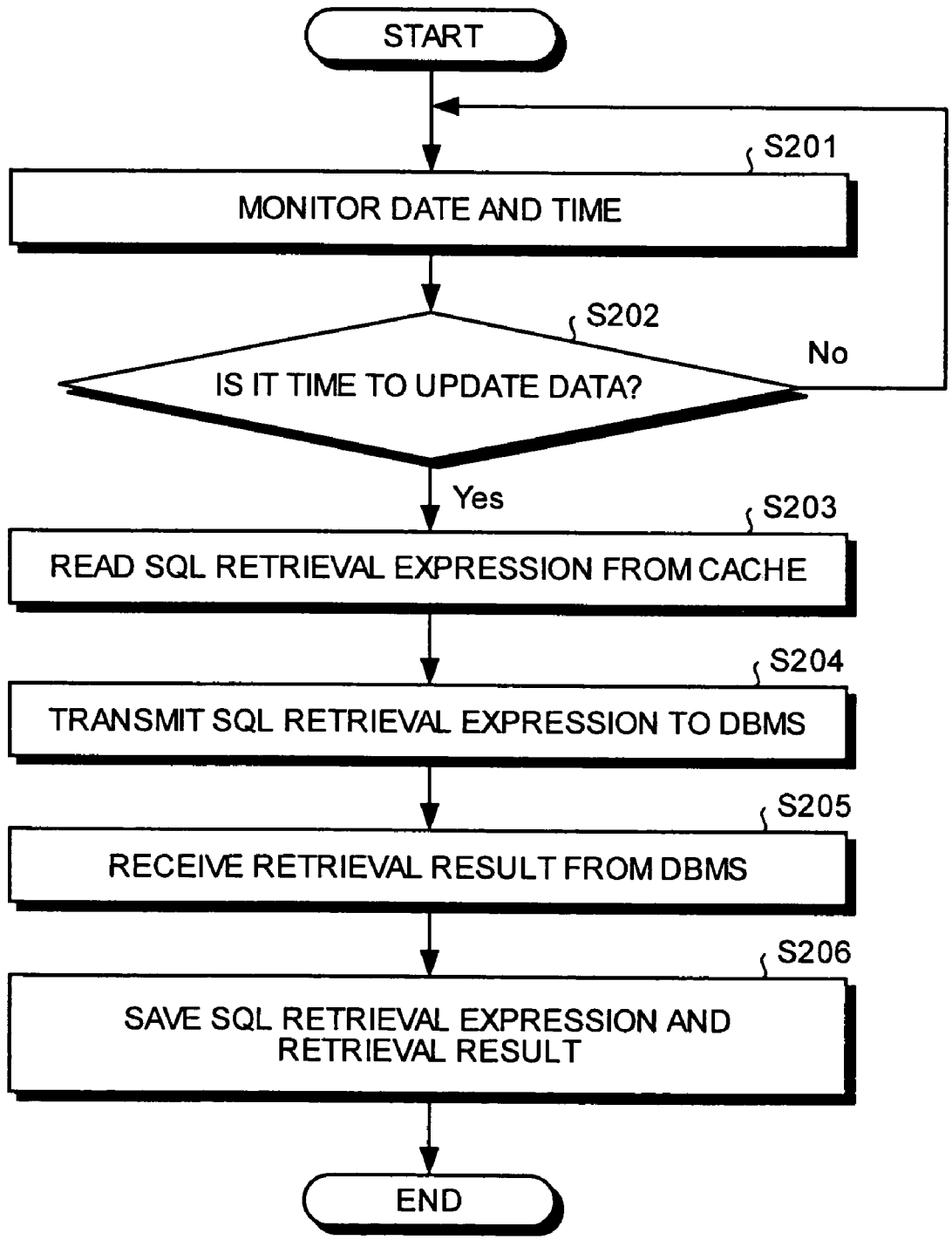

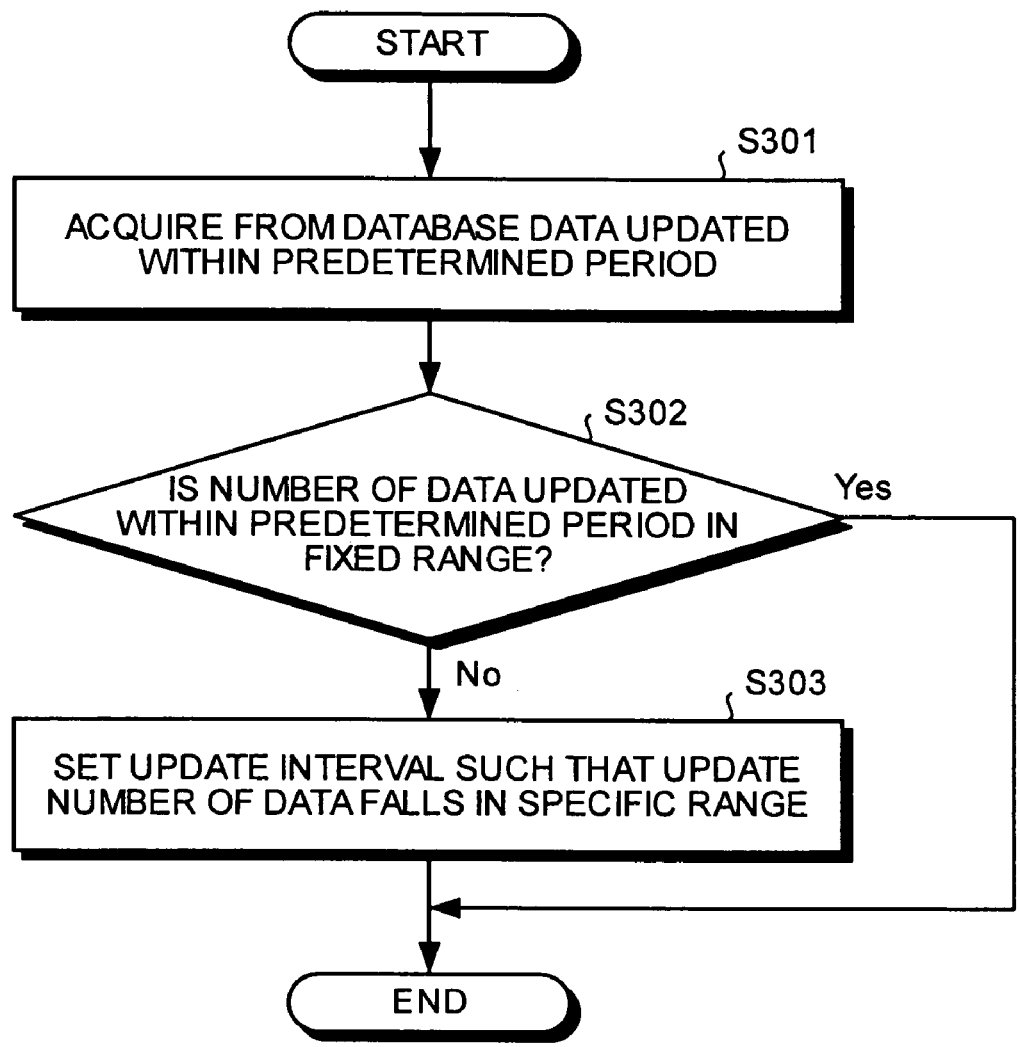

APPLICATION SERVER, CACHE PROGRAM, AND APPLICATION SERVER SYSTEM

BACKGROUND OF THE INVENTION

1) Field of the Invention

The present invention relates to a technology for matching contents of a cache memory to contents of a database.

2) Description of the Related Art

Systems are known that make is possible to execute electronic-commerce transactions, over the Internet and using a web browser, from terminal of the users, or make it possible to access database of an enterprise, over the Internet and using a web browser, from terminal of the users. An application server is used in such systems as a middleware to control access to the database from the terminals of the users.

Although it is difficult to handle status transition in the web browser, it is not so difficult in the application server. Therefore, the systems mentioned above can be easily construction and operates smoothly when the application server is provided as the middleware.

In such systems, a cache is provided to reduce frequency of access to the database. A related technology has been disclosed in, for example, Introduction to Web system, Jan. 23, 2003, HYPERLINK http://www.atmarkit.co.jp/fjava/rensai2/websys08/websys08.html.

However, when the database is updated, a mismatch is produced between the contents in the cache memory and the contents in the database. To solve this problem, a notification that indicates that the database has been updated is sent to the application server and the application server refreshes the contents in the cache to match with the contents in the database.

However, there is a problem that it is necessary to provide a means to generate and output the notification that indicates that the database has been updated.

In recent years, especially, parts-production of a program running in an application server or the like has advanced due to object-oriented languages such as JAVA 2 Enterprise Edition (J2EE). However, the parts-production of the program becomes difficult due to dependence on the processing performed at the database-side.

Further, cache contents in the application server are not stored at the database side, and a location in the database from which the cache contents have been extracted is not stored at the server side. Hence, when the database has been updated, an update notification is transmitted regardless of whether the cache contents should be refreshed, and moreover, the application server erases from the cache, even data that is not required to be updated. As a result, excessive cache refreshing occurs, which results in an increased load on the server.

Further, when the number of application servers connected to a database increases, load required for the database to perform a cache processing in each application server increases, which reduces the processing speed of the database.

SUMMARY OF THE INVENTION

It is an object of the present invention to solve at least the problems in the conventional technology.

An application server according to one aspect of the present invention retrieves data from a database using a retrieval request, which includes a retrieval condition, received from a terminal and transmits the data retrieved as a retrieval result to the terminal. The application server includes a cache memory that stores in a correlated form the retrieval condition and the retrieval result; an update condition setting unit that sets a cache update condition that indicates when the cache memory is to be updated; and an update processing unit that reads the retrieval condition from the cache memory upon fulfillment of the cache update condition, retrieves data as the retrieval result from the database using the retrieval condition, and updates the retrieval result in the cache memory corresponding to the retrieval condition.

A cache program according to another aspect of the present invention makes a computer execute setting a cache update condition that indicates when the cache memory is to be updated; and reading the retrieval condition from the cache memory upon fulfillment of the cache update condition, retrieving data as the retrieval result from the database using the retrieval condition, and updating the retrieval result in the cache memory corresponding to the retrieval condition.

An application server system according to still another aspect of the present invention includes a plurality of application servers, each of which retrieves data from a database using a retrieval request, which includes a retrieval condition, received from a terminal and transmits the data retrieved as a retrieval result to the terminal, each application server including a cache memory that stores in a correlated form the retrieval condition and the retrieval result; an update condition setting unit that sets a cache update condition that indicates when the cache memory is to be updated; and an update processing unit that reads the retrieval condition from the cache memory upon fulfillment of the cache update condition, retrieves data as the retrieval result from the database using the retrieval condition, and updates the retrieval result in the cache memory corresponding to the retrieval condition.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 6 is a flowchart of a process performed when the application server updates cache contents; and FIG. 7 is a flowchart of a process performed when an update interval setting section-sets an update interval automatically.

DETAILED DESCRIPTION

Exemplary embodiments of an application server and a cache program according to the present invention will be explained below with reference to the accompanying drawings.

Figure 1:
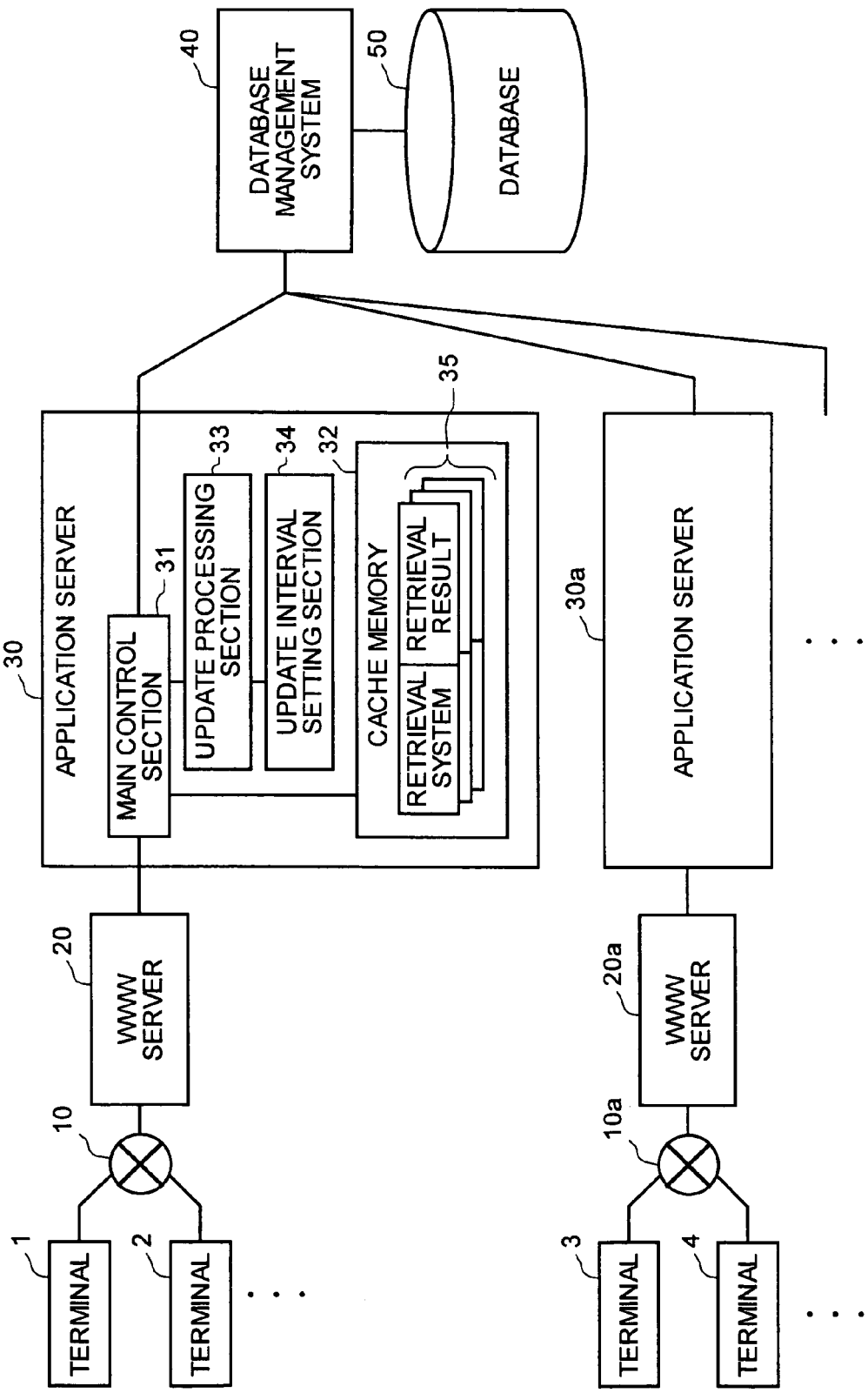
FIG. 1 is a schematic configuration of an application server according to an embodiment of the present invention.

FIG. 1 is a schematic configuration of an application server according to an embodiment of the present invention. A terminal 1 and a terminal 2 are connected to an application server 30 via a network 10 and a World Wide Web (hereinafter, "WWW") server 20. Further, the application server 30 is connected to a database 50 via a database management system (hereinafter, "DBMS") 40.

The application server 30 includes a main control section 31, a cache memory 32, an update processing section 33 and an update interval setting section 34. The main control section 31 controls the entire-application server 30. Particularly, upon receiving a retrieval request from the terminals 1 and 2 via the WWW server 20 and the network 10, the main control section 31 produces a structure query language (hereinafter, "SQL") retrieval expression. The main control section 31 transmits the SQL retrieval expression to the DBMS 40. Based on the retrieval expression, the DBMS 40 searches data from the database and transmits it as a retrieval result to the application server 30. The application server further transmits this data to the terminal and simultaneously saves the retrieval result and its corresponding SQL retrieval expression in the cache memory 32 in a correlated form 35.

The update processing section 33 refreshes the correlated data saved in the cache memory 32 at an update interval set by the update interval setting section 34. Specifically, the update processing section 33 monitors date and time, and transmits a refresh request to the main control section 31 based on the update interval. When the main control section 31 receives an update request, it reads out the SQL retrieval expression saved in the cache memory 32, retrieves data from the database 50 as the retrieval result, and saves the retrieval result corresponding to the retrieval expression, in the cache memory 32. Thus, the contents of the cache are updated to the latest state.

Upon receiving the SQL retrieval expression from the application server 30, the DBMS 40 executes a retrieval process in the database 50 using the SQL retrieval expression and transmits the retrieval result to the application server 30.

By providing the update processing section 33 in the application server 30 to update the contents in the cache memory at fixed intervals, the contents in the cache memory can be updated to the latest state without depending on the DBMS 40 and the database 50.

Terminals 3 and 4, a network 10a, a WWW server 20a and an application server 30a have configurations similar to those of the terminals 1 and 2, the network 10, the WWW server 20 and the application server 30, respectively, and the application server 30a can update the contents in the cache memory like the application server 30.

That is, since all application servers connected to the DBMS 40 update their own caches independently, the DBMS 40 is not required to transmit an update request to each application server. Consequently, processing load on the DBMS 40 can be reduced.

Therefore, even if the number of application servers to be connected to the DBMS 40 increases, the DBMS 40 can operate stably without affecting processing speed. Further, since the application server 30 operates independent of the database 50, configuration changes such as addition, deletion of an application server or the like can be made easily.

Figure 2:
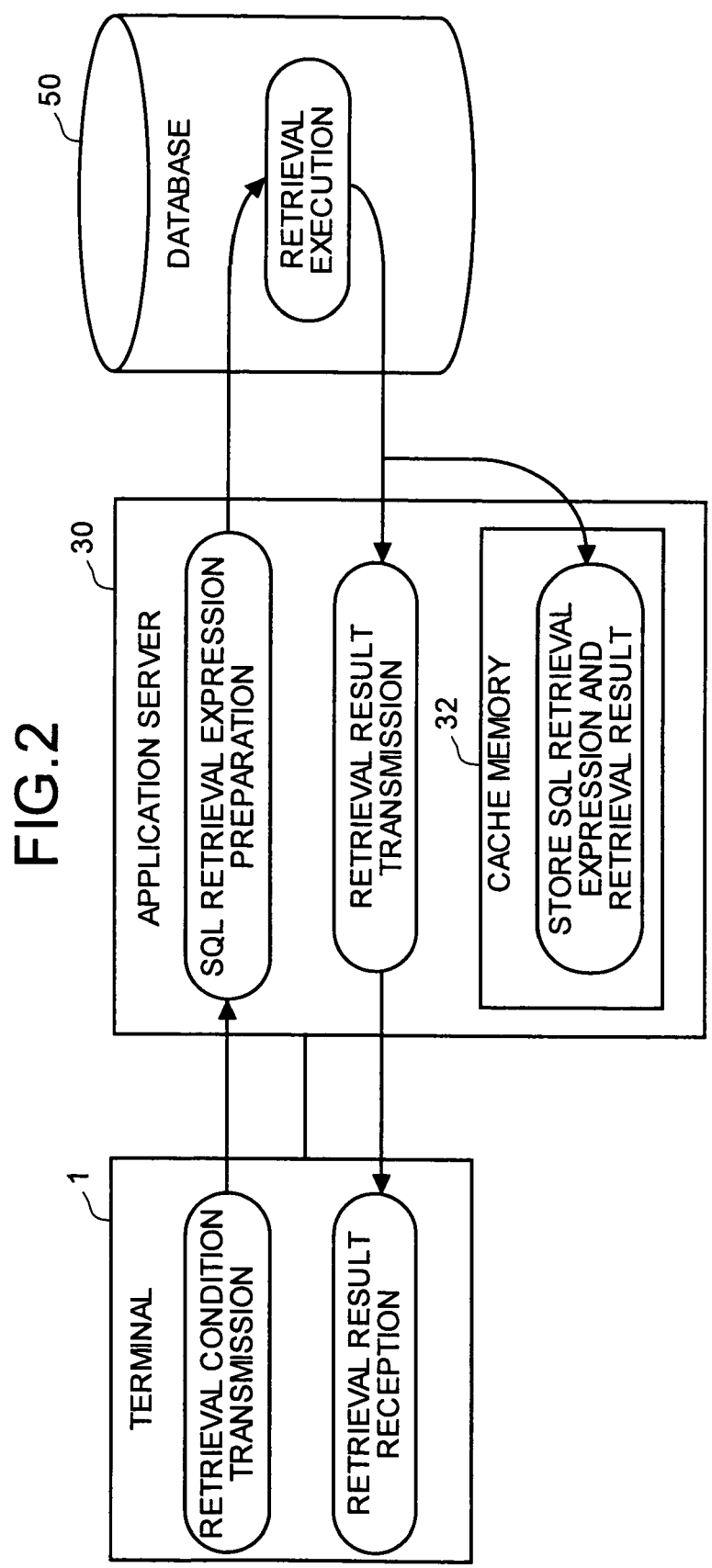
FIG. 2 is an explanatory diagram of a case when the application server retrieves data from a database.

FIG. 2 is an explanatory diagram of a case when the application server 30 retrieves data from the database 50. When the terminal 1 transmits a retrieval condition, the application server 30 prepares an SQL retrieval expression based on the retrieval condition. Further, the application server 30 confirms whether the same SQL retrieval expression is saved in the cache memory 32. If the SQL expression is not found in the cache memory 32, the application server 30 transmits the SQL retrieval expression to the DBMS 40.

The DBMS 40 retrieves data from the database 50 using the SQL retrieval expression received and transmits a retrieval result to the application server 30. The application server 30 further transmits the retrieval result to the terminal 1, which is a source for the retrieval request. At the same time, the application server 30 stores in the cache memory 32, the SQL retrieval expression transmitted to the DBMS 40 and the retrieval result received from the DBMS 40, in a correlated form.

Figure 3:
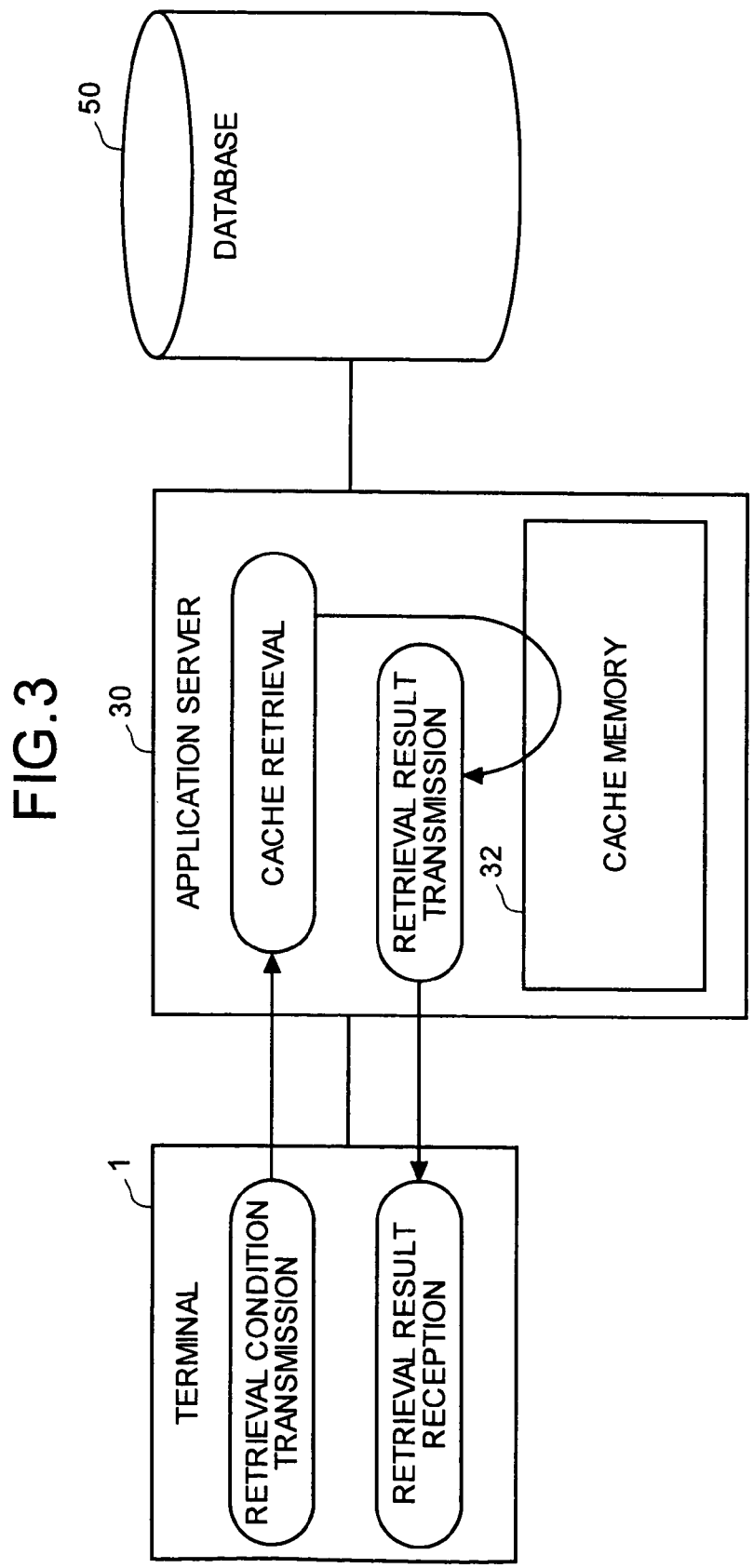
FIG. 3 is an explanatory diagram of a case when the application server retrieves data from a cache memory.

FIG. 3 is an explanatory diagram of a case when the application server 30 retrieves data from the cache memory 32. When the terminal 1 transmits a retrieval condition, the application server 30 produces an SQL retrieval expression based on the retrieval condition. Further, the application server 30 confirms whether the same SQL retrieval expression has already been saved in the cache memory 32. If the same retrieval expression is found in the cache memory 32, the application server 30 reads the retrieval result out of the cache memory 32 and transmits it to the terminal 1, which is a source for the retrieval request.

Figure 4:
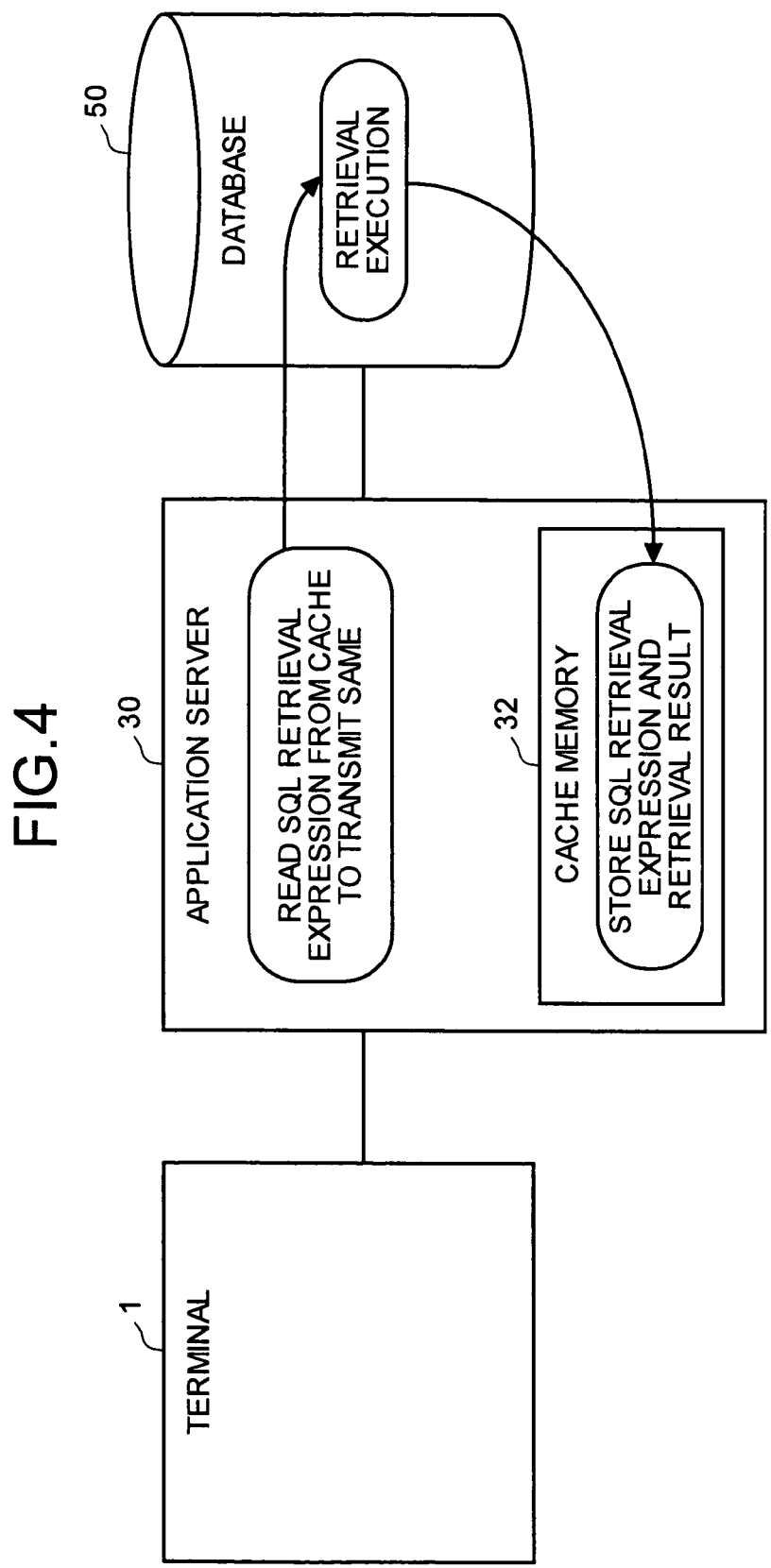
FIG. 4 is an explanatory diagram of updating a cache.

FIG. 4 is an explanatory diagram of updating a cache in the application server 30. When the update processing section 33 outputs an update request, the application server 30 reads the SQL retrieval expression from the cache memory 32 and transmits the same to the DBMS 40.

The DBMS 40 retrieves data from the database 50 using the SQL retrieval expression received from the application server 30 and transmits a retrieval result to the application server 30. The application server 30 also stores the retrieval result into the cache memory 32, thereby updating the contents in the cache memory 32.

After retrieving data from the database 50, the application server 30 stores the retrieval condition and the retrieval result in the cache memory 32 in a correlated form. Thereafter, if a retrieval condition is found in the cache memory 32, the application server 30 reads the retrieval result from the cache memory 32 instead of accessing the database 50. Consequently, load on the database 50 can be reduced. Further, when updating the cache, the application server 30 retrieves data from the database 50 using the retrieval conditions (the SQL retrieval expression) already stored in the cache memory 32. Therefore, on the database side, only a function that performs retrieval using the SQL retrieval expression is sufficient.

Figure 5:
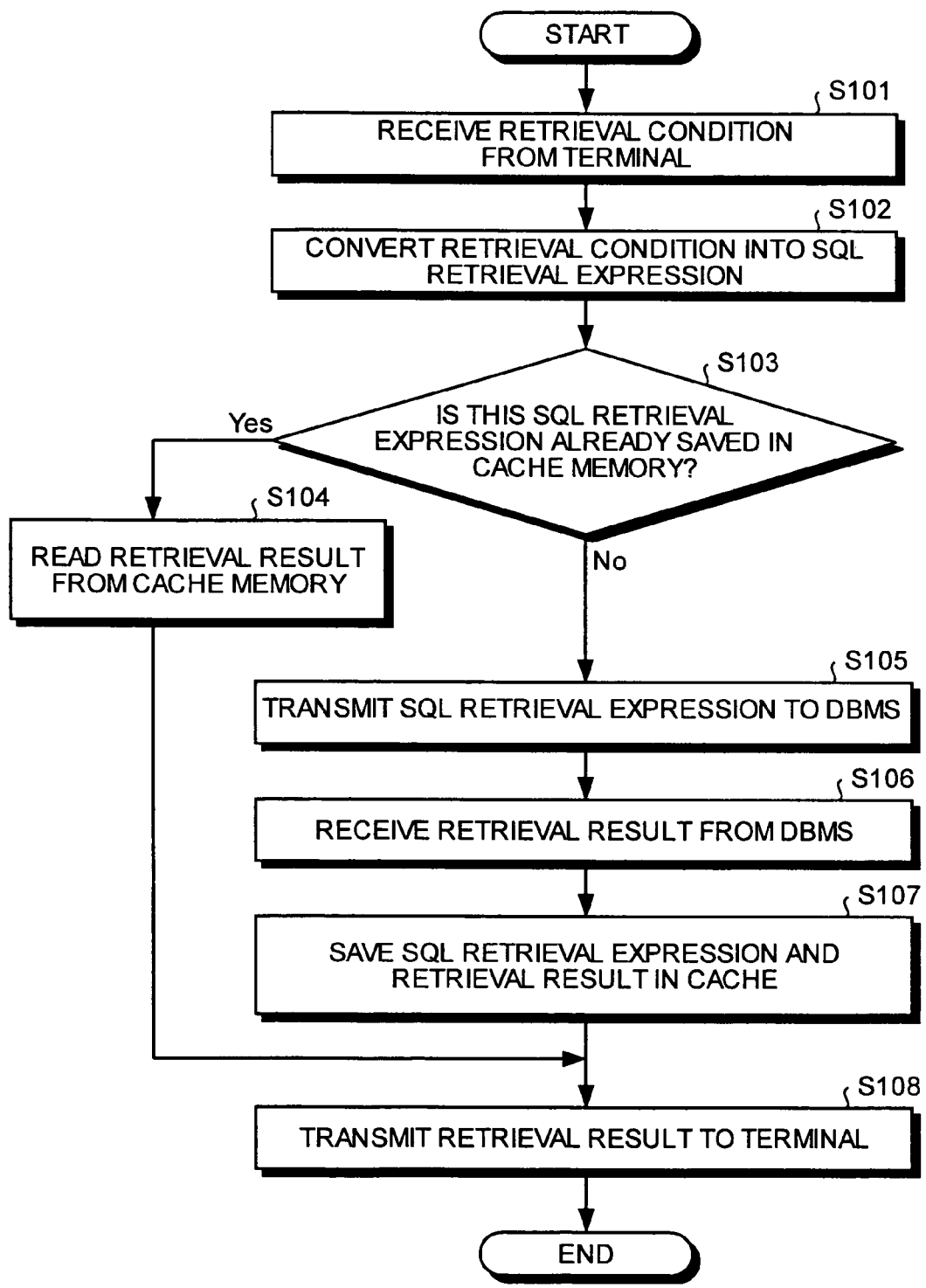
FIG. 5 is a flowchart of a process performed by the application server upon receiving a retrieval condition-from a terminal.

FIG. 5 is a flowchart of a process performed by the application server 30 upon receiving a retrieval condition from a terminal. When the application server 30 receives a retrieval condition from a terminal (Step S101), the main control section 31 converts the retrieval condition into an SQL retrieval expression (Step S102). Next, the main control section 31 confirms whether the converted SQL retrieval expression is already saved in the cache memory 32 (Step S103).

If the SQL retrieval expression is found in the cache memory 32 (Yes at Step S103), the main control section 31 reads the retrieval result from the cache memory 32, transmits the retrieval result to the terminal (Step S108) and the process is terminated.

On the other hand, if the SQL retrieval expression is not found in the cache memory 32 (No at Step S103), the main control section 31 transmits the SQL retrieval expression to the DBMS 40 (Step S105). Then, after the main control section 31 receives the retrieval result from the DBMS 40 (Step S106), stores the SQL retrieval expression and the retrieval result in the cache memory 32 in a correlated form (Step S107), transmits the retrieval result to the terminal (Step S108), and the process is terminated.

FIG. 6 is a flowchart of a process performed when the application server 30 updates the cache contents. The update processing section 33 monitors date and time (Step S201). If it is time to update the data (Yes at Step S202), the update processing section 33 transmits an update request to the main control section 31.

The main control section 31 receives the update request, reads the SQL retrieval expression from the cache (Step S203) and transmits the SQL retrieval expression to the DBMS 40 (Step S204). Thereafter, the main control section 31 receives the retrieval result from the DBMS 40 (Step S205). The SQL retrieval expression transmitted in Step S204 and the retrieval result are saved in the cache memory 32 in a correlated form (Step S206) and the process is terminated.

When the update interval of the cache memory 32 is set to be excessively short as compared to the update frequency of the database 50, updating of the cache memory is repeated even when updating does not occur in the database, 50, which causes unnecessary traffic in the network and reduces the communication speed of the network. Further, when the update interval of the cache memory 32 is set to be excessively long as compared to the update frequency of the database 50, the application server 30 eventually transmits data, before updating, to the terminal as the retrieval result. This results in mismatching of the retrieval result.

In view of these circumstances, the update interval set by the update interval processing section 34 must be set according to the update frequency in the database 50. One way to achieve this is that a user can set the update interval after confirming the update frequency in the database 50, or the update interval setting section 34 can set a proper update interval automatically by acquiring the update frequency in the database 50.

FIG. 7 is a flowchart of a process performed when the update interval setting section 34 sets the update interval automatically. The update interval setting section 34 first acquires from the database 50, data updated within a predetermined period (Step S301). The update interval setting section 34 determines whether the number of data records updated within the predetermined period is in a fixed range (Step S302). If the number of data records updated within the predetermined period is in the fixed range (Yes at Step S302), the process is terminated.

However, if the number of data records updated within the predetermined period is not in the fixed range (No at Step S302), the update interval setting section 34 sets the update interval such that the number of data records updated fall in a specific range, and then the process is terminated.

By setting the update frequency of the database 50 in this manner, the cache can be updated without increasing the load on the database.

Another method is to update the cache contents and set the update interval simultaneously. That is, when the retrieval result is acquired using the SQL retrieval expression at an updating time of the cache memory, an update date and time of data included in the retrieval result may be acquired and the next and subsequent update intervals may be set using the acquired update date and time.

By setting the update interval using the retrieval result at the updating time of the cache contents, a load on the database 50 can be reduced and the update interval can be set using data included in the cache contents. That is, even if updating frequently occurs in the entire database, when the update frequency in the data accessed via the application server 30 is low, the update interval of the cache in the application server 30 can be prolonged.

Similarly, when there is more than one application server connected to the database, the update intervals of all the application servers can be set independent of one another. In other words, the update interval of the application servers may be identical or may differ.

As described above, in the application server 30 according to the present embodiment, the SQL retrieval expression is read from the cache memory, transmitted to the DBMS 40 based on the update interval indicated by the update interval setting section 34, and the contents of the cache are updated according to the retrieval result received from the DBMS 40. Thus, the contents of the cache can be updated to the latest status without depending on the DBMS 40 or the database 50.

Consequently, processing of the database can be performed at a high speed by reducing a load on the database side. Moreover, by dividing the cache process into parts, a highly versatile cache program can be realized.

In this embodiment, the cache program divided into parts resides in the application server. However, the location of the cache program is not limited to the application server. It can also be broadly applied to any apparatus performing cache processing including, but not limited to, a WWW server.

According to one aspect of the present invention, the application server can update the cache contents without depending on the database.

Moreover, an application server can update the cache contents at an update interval that is automatically set and that matches an update interval of the database.

Furthermore, the application server can update the cache contents at an update interval that is set by a user. Thus, a user can have the choice of when the cache memory should be updated.

Moreover, the application server can update the cache contents without imparting a load on the database.

According to another aspect of the present invention, when there are a plurality of application servers to which terminals are connected via a network, and which access the same database, the update interval in each application server can be set as required. Thus, the application servers update their cache memory independently. Consequently, although there are a plurality of application servers that access the same database, the frequency of accessing the database is reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An application server that retrieves data from a database management system using a retrieval condition received from a terminal and transmits the data retrieved as a retrieval result to the terminal, comprising:

a cache memory that stores in a correlated form the retrieval condition and the retrieval result;

an update condition setting unit that sets a cache update condition that indicates when the cache memory is to be updated;

an update processing unit that determines whether to transmit an update request to update the retrieval result based on the cache update condition; and a main controlling unit that sends, to the database management system, a retrieval expression which is produced based on the retrieval condition received from a client terminal or read from the cache memory, based on the update request received from the update processing unit, and receives the retrieval result of a database from the database management system and stores the retrieval condition and the retrieval result in the correlated form in the cache memory, wherein the update condition setting unit acquires a number of data records updated within a predetermined period from the database, and determines whether the number of data records updated is in a fixed range of the data records and, if the number of data records updated is not in the fixed range, the update condition setting unit sets the cache update condition such that the number of data records updated falls in the fixed range.

2. The application server according to claim 1, wherein, when searching the database, the update processing unit acquires a database update condition that indicates when the database is updated and the update condition setting unit sets the cache update condition based on the database update condition acquired.

3. The application server according to claim 1, wherein a user sets the cache update condition.

4. The application server according to claim 1, wherein the update processing unit sets next and subsequent cache update conditions using a date and a time of the retrieval result updated.

5. An application server system comprising:
a plurality of application servers, each of which retrieves data from a database management system using a retrieval condition, received from a terminal and transmits the data retrieved as a retrieval result to the terminal, each application server including
a cache memory that stores in a correlated form the retrieval condition and the retrieval result;
an update condition setting unit that sets a cache update condition that indicates when the cache memory is to be updated;
an update processing unit that determines whether to transmit an update request based on the cache update condition; and
a main controlling unit that sends, to the database management system, a retrieval expression which is produced based on the retrieval condition received from a client terminal or read from the cache memory, based on the update request received from the update processing unit, and receives the retrieval result of a database from the database management system and stores the retrieval condition and the retrieval result in the correlated form in the cache memory, wherein
the update condition setting unit acquires a number of data records updated within a predetermined period from the database, and determines whether the number of data records updated is in a fixed range of the data records and, if the number of data records updated is not in the fixed range, the update condition setting unit sets the cache update condition such that the number of data records updated fall in the fixed range.

6. The application server system according to claim 5, wherein the cache update condition of each application server differs from the cache update condition of any other application server.

7. The application server system according to claim 5, wherein the cache update condition of all the application servers is identical.

8. A cache update method comprising:
storing a retrieval condition received from a terminal and a retrieval result retrieved using the retrieval condition in a correlated form in a cache memory;
reading the retrieval result from the cache memory when a retrieval request is identical to the stored retrieval request;
setting a cache update condition that indicates when the cache memory is to be updated;
determining whether to transmit an update request based on the cache update condition;
sending, to the database management system, a retrieval expression, which is produced based on the retrieval condition received from a client terminal or read from the cache memory, based on the update request received at the determining;
receiving the retrieval result of a database from the database management system; and
storing the retrieval condition and the retrieval result in the correlated form in the cache memory, wherein
the setting includes acquiring a number of data records updated within a predetermined period from the database, and determining whether the number of data records updated within the predetermined period is in a fixed range of the data records and, if the number of data records updated is not in the fixed range, the setting includes setting the cache update condition such that the number of data records updated fall in the fixed range.

9. An application server comprising:
a cache memory that stores therein in a correlated form a retrieval expression and a retrieval result; and
a main controlling unit that sends, to a database management system, the retrieval expression that is produced based on a retrieval condition received from a client terminal or read from the cache memory based on a cache update condition, receives the retrieval result of a database by the retrieval expression from the database management system, and stores the retrieval expression and the retrieval result in the correlated form in the cache memory, wherein
the main controlling unit acquires a number of data records updated within a predetermined period from the database management system, and determines whether the number of data records updated is in a fixed range of the data records and, if the number of data records updated is not in the fixed range, the main controlling unit sets the cache update condition such that the number of data records updated fall in the fixed range.

10. A cache control method comprising:
storing a retrieval expression and a retrieval result in a correlated form in a cache memory; and
sending, to a database management system, the retrieval expression that is produced based on a retrieval condition received from a client terminal or read from the cache memory based on a cache update condition;
receiving the retrieval result of a database by the retrieval expression from the database management system; and
storing the retrieval expression and the retrieval result in the correlated form in the cache memory, wherein
the sending includes acquiring a number of data records updated within a predetermined period from the database management system, and determining whether the number of data records updated is in a fixed range of the data records and, if the number of data records updated is not in the fixed range, the sending includes setting the cache update condition such that the number of data records updated fall in the fixed range.

* * * * *

UNITED STATES PATENT AND TRADEMARK OFFICE
CERTIFICATE OF CORRECTION

PATENT NO. : 7,711,720 B2  
APPLICATION NO. : 10/766839  
DATED : May 4, 2010  
INVENTOR(S) : Takamune Suzuki It is certified that error appears in the above-identified patent and that said Letters Patent is hereby corrected as shown below:

Column 7, Line 20, change "condition," to --condition--.

Column 7, Line 47, change "fall" to --falls--.

Column 8, Line 21, change "fall" to --falls--.

Column 8, Line 41, change "fall" to --falls--.

Column 8, Line 60, change "fall" to --falls--.

Signed and Sealed this

Tenth Day of August, 2010

David J. Kappos  
*Director of the United States Patent and Trademark Office*